(12) United States Patent
Risser et al.

(10) Patent No.: US 8,736,942 B2
(45) Date of Patent: May 27, 2014

(54) ELECTROCHROMIC DEVICE CAPABLE OF CONTROLLING VISIBLE AND INFRARED RADIATIONS

(75) Inventors: Steven M. Risser, Reynoldsburg, OH (US); Vincent D. McGinniss, Columbus, OH (US); Amy M. Heintz, Dublin, OH (US); Kevin B. Spahr, Columbus, OH (US); James D. Browning, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 12 days.

(21) Appl. No.: 13/583,747

(22) PCT Filed: Mar. 11, 2011

(86) PCT No.: PCT/US2011/028013
§ 371 (c)(1),
(2), (4) Date: Sep. 24, 2012

(87) PCT Pub. No.: WO2011/112882
PCT Pub. Date: Sep. 15, 2011

(65) Prior Publication Data
US 2013/0010346 A1 Jan. 10, 2013

Related U.S. Application Data

(60) Provisional application No. 61/313,233, filed on Mar. 12, 2010.

(51) Int. Cl.
*G02F 1/153* (2006.01)
*G02F 1/15* (2006.01)

(52) U.S. Cl.
USPC .......... 359/270; 359/265; 359/273; 359/274; 359/275; 345/105

(58) Field of Classification Search
CPC .......................................................... G02F 1/00
USPC .................. 359/265–275; 348/817; 345/105; 977/742
See application file for complete search history.

(56) References Cited

U.S. PATENT DOCUMENTS

| | | | |
|---|---|---|---|
| 4,068,928 A * | 1/1978 | Meyers et al. | 359/269 |
| 4,088,392 A * | 5/1978 | Meyers | 359/275 |
| 4,457,723 A | 7/1984 | Tate | |
| 4,659,619 A | 4/1987 | Tate | |
| 4,762,401 A | 8/1988 | Baucke et al. | |
| 5,105,303 A | 4/1992 | Ilhage | |
| 5,774,255 A * | 6/1998 | Howard | 359/267 |
| 5,777,780 A * | 7/1998 | Terada et al. | 359/273 |
| 5,923,456 A * | 7/1999 | Tench et al. | 359/266 |
| 6,166,847 A * | 12/2000 | Tench et al. | 359/266 |
| 6,369,934 B1* | 4/2002 | Bechinger et al. | 359/265 |
| 6,791,738 B2 | 9/2004 | Reynolds et al. | |
| 6,903,036 B2 | 6/2005 | Akimoto et al. | |
| 6,933,023 B2 | 8/2005 | Clausen et al. | |
| 7,008,694 B1 | 3/2006 | Frankel | |
| 7,110,157 B2 | 9/2006 | Beteille et al. | |
| 7,298,541 B2 | 11/2007 | Liu et al. | |
| 7,333,257 B2 | 2/2008 | Reynolds et al. | |

(Continued)

*Primary Examiner* — Loha Ben
(74) *Attorney, Agent, or Firm* — MacMillan, Sobanski and Todd, LLC

(57) ABSTRACT

An electrochromic device that is capable of changing the transmission of either visible or infrared radiations as a function of the polarity of a voltage applied to the device.

20 Claims, 5 Drawing Sheets

(56) References Cited

U.S. PATENT DOCUMENTS

| | | |
|---|---|---|
| 7,333,258 B2 | 2/2008 | Yang et al. |
| 7,354,877 B2 | 4/2008 | Rosenberger et al. |
| 7,450,290 B2 | 11/2008 | Xu et al. |
| 7,505,191 B2 | 3/2009 | Liu et al. |
| 7,557,499 B2 | 7/2009 | Reynolds |
| 7,973,997 B2 * | 7/2011 | Lee .............................. 359/275 |
| 8,094,361 B2 * | 1/2012 | Hampp et al. ................. 359/275 |
| 8,432,604 B2 * | 4/2013 | Lee ................. 359/275 |
| 8,545,030 B2 * | 10/2013 | Anderson et al. ............. 359/604 |
| 2004/0233499 A1 | 11/2004 | Betelle et al. |
| 2006/0033978 A1 | 2/2006 | Morin et al. |
| 2007/0041074 A1 | 2/2007 | Mathey et al. |
| 2008/0198278 A1 | 8/2008 | Ludwig et al. |
| 2009/0195714 A1 | 8/2009 | Huang |

\* cited by examiner

Table- Peak height in Raman spectra of ORGACON film

| Condition | Spectrum | Peak (cm⁻¹) | Peak Height | 1421 cm⁻¹ / 1612cm⁻¹ Ratio |
|---|---|---|---|---|
| 0 volts | RA1M ECDevice1BC spc | 1421.80 | 8331.79 | 0.614 |
| 9 volts | RA1M ECDevice2BC spc | 1421.80 | 19780.19 | 1.966 |
| 0 volts | RA1M ECDevice3BC spc | 1423.83 | 7730.06 | 0.581 |
| 0 volts | RA1M ECDevice1BC spc | 1612.57 | 13573.13 | |
| 9 volts | RA1M ECDevice2BC spc | 1612.57 | 10060.62 | |
| 0 volts | RA1M ECDevice3BC spc | 1612.57 | 13294.94 | |

ELECTROCHROMIC DEVICE CAPABLE OF CONTROLLING VISIBLE AND INFRARED RADIATIONS

CROSS-REFERENCE TO RELATED APPLICATIONS

This application claims the benefit of U.S. Provisional Application No. 61/313,233, filed Mar. 12, 2010, the disclosure of which is incorporated herein by reference.

BACKGROUND OF THE INVENTION

This invention relates in general to electro-chromatic devices and in particular to an electro-chromatic device that is capable of changing its response in both the visible and infrared light ranges.

There are multiple known technologies for making a "chameleon" cloth, or a coating structure, that can readily change color to allow for camouflage of personnel or objects from visible detection. Included in these known technologies are:

(1) Electro-chromatic dyes/pigments/polymers, where a material changes its electrooptic properties through the application of an electric potential across the material.

(2) Thermo-chromatic dyes/pigments, where a material changes color as its temperature changes. For example, a special dye may be used that contains liquid color crystals inside miniature capsules. When the temperature of a fabric treated with such a dye changes, the crystals can lose their color and become clear, revealing the color of a material that is underneath the dyed fabric.

(3) Electro-strictive polymers, or dielectric elastomers, where the material can reduce or increase its volume by 30%, when exposed to an electric field. This physical change may be linked to a color change of the material.

(4) Electrically conductive polymers where electrons can move from one end of the polymer to the other when the polymer is exposed to electic or chemical stimulations. This physical change may be linked to a color change of the material.

Referring now to FIG. 1, there is shown a cross sectional view of a typical electro-chromic device 10 that has multiple layers of material deposited between two glass substrates 12. Alternately, the multiple layers may be deposited upon a single glass substrate (not shown). As shown in FIG. 1, upper and lower transparent conductors, 14 and 16, respectively, are deposited the inner surface of each of the glass substrates 12. An electro-chromatic layer 18 is deposited upon the lower surface of the upper conductor 14 while an ion storage layer 20 is deposited upon the upper surface of the lower conduction 16. The electro-chromatic layer 18 is formed from a material that changes color upon receiving charged ions. Finally, a layer of polymer electrolyte 22 is positioned between the electro-chromatic layer 18 and the ion storage layer 20. The transparent conductors 14 and 16 are electrically connected through a switch 24 to a voltage supply 26. Upon closure of switch 24, a voltage is applied across the layers placed between the glass substrates 12 and drives ions from the ion storage layer 20 into the electro-chromatic layer 18 to cause a change of color of the device 10.

In many cases, instead of utilizing dual or single glass substrates, the transparent conductor material can be coated onto a polymer to make a semi-flexible device, where the limits on flexibility are determined by the point where the transparent conductor loses function. Recent examples have also been shown where a conducting polymer is used as the transparent conductor and as the electro-chromic-material, which results in simplified device construction.

However, there still remains a need for an improved cloth or coating structure, which can readily change color, to allow for the camouflage of personnel or objects from visible detection. Similarly, there remains a need for a cloth or coating structure which can control the Infra-Red (IR) signature of objects, to provide camouflage from passive IR sensors. Ideally, these two needs would be met with a single cloth or coating structure.

SUMMARY OF THE INVENTION

This invention relates to an electro-chromatic device that is capable of changing its response in both the visible and infrared light ranges.

The present invention contemplates an electro-chromatic device that includes a first conductor over which a layer of IR control material is disposed. The device also includes a layer of electrolytic material disposed upon a surface of the IR control material that is opposite from the first transparent conductor. The device further includes a layer of color changeable material disposed upon a surface of the electrolytic material that is opposite from the IR control material and a second conductor disposed upon a surface of the color changeable material that is opposite from the electrolytic material.

The invention also contemplates that at least one of the conductors is transparent and that the color changeable material may include an electro-chromatic material. The invention further contemplates that at least one of the conductors is formed as a Carbon NanoTube (CNT) film. The materials may be formed either as parallel sheets or as a fiber that is woven into a fabric. When formed as parallel sheets, the layers may be placed upon a flexible substrate or between two flexible substrates.

The invention also contemplates including a switching device to connect a voltage supply to the conductors to activate either the layer of color changeable material or the layer of the IR control material. Application of a voltage of a first polarity will activate the color changeable layer to cause the device to change color while application of a second voltage that has opposite polarity form the first voltage will activate the IR control material to cause a change in the IR signature or the device. Removal of the voltage causes the device to revert to its original state.

The invention further contemplates a method for operating the electro-chromatic device described above that includes applying a voltage to the transparent layers to cause one of the color of the material to change or the IR signature of the material to change. The polarity of the applied voltage determines which material is activated with the material reverting to its original state upon removal of the voltage, as described above.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

The present invention is directed toward a device or a fiber that is capable of changing its response both in the visible and the Infra-Red (IR) light ranges. Both the induced color change and the IR change are controlled by the material selected to be utilized in the device. The selection between color change and IR change is controlled by the polarity of the applied voltage.

The IR energy in a specific wavelength range that is radiated by an object is equal to the emissivity, E, of the object times a complicated function of its temperature Thus, one way to control the IR energy radiated from an object is to control the emissivity of the object in the wavelength range of interest. The emissivity $E_\lambda$ of an object at any given wavelength is determined from the relation:

$$T_\lambda + R_\lambda + A_\lambda = 1, \text{ where:}$$

T is transmission,
R is reflectance, and
A is absorptivity.

For an object at thermal equilibrium, the emissivity is equal to the absorptivity, or:

$$A_\lambda = E_\lambda.$$

Additionally, for opaque objects, transmission equals zero, which results in:

$$E_\lambda = 1 - R_\lambda.$$

Figure 1:
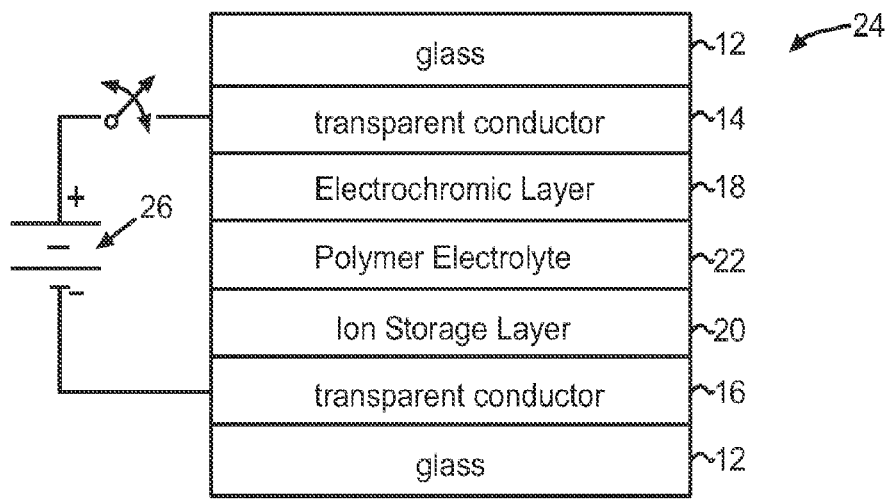
FIG. 1 is a cross section of a prior art electro-chromatic device.
Figure 2:
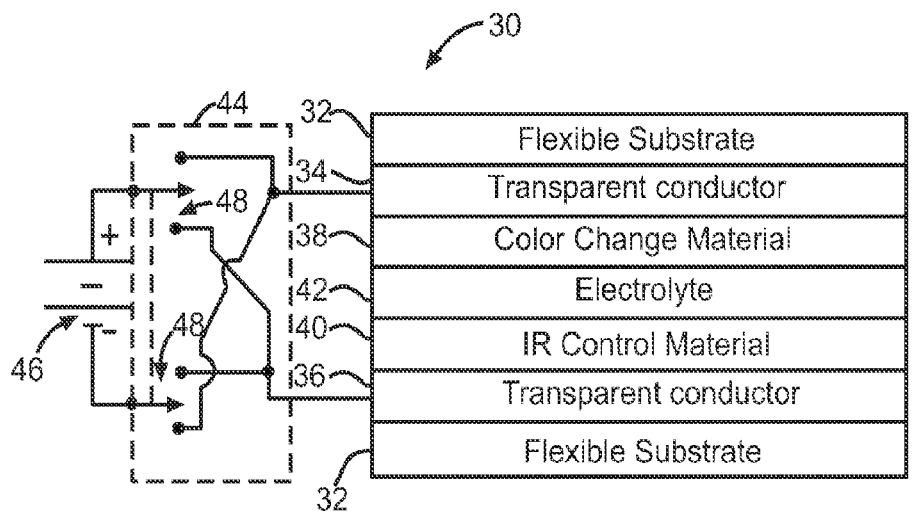
FIG. 2 is a cross section of an electro-chromatic device in accordance with the present invention.

The present invention utilizes two materials that are both enabled either cathodically or anodically. One of the materials is capable of changing color while the other is capable of changing its IR signature upon receiving charged particles. As a result, the polarity of the applied voltage determines which material is activated. Referring now to the drawings, there is illustrated in FIG. 2, a cross sectional view of an electro-chromatic device 30 that is in accordance with the present invention. The device 30 has multiple layers of material deposited between two flexible transparent substrates 32. While two transparent substrates 32 are shown in FIG. 2, it will be appreciated that the invention also may be practiced with a single transparent substrate or two opaque substrates, as long as the substrate materials do not interfere with the desired color changes or the IR signature changes of the device. Alternately, the multiple layers may be deposited upon a single flexible substrate (not shown). As shown in FIG. 2, upper and lower transparent conductors, 34 and 36, respectively, are deposited the inner surface of each of the flexible substrates 32. While two transparent conductors 34 and 36 are shown in FIG. 2, it will be appreciated that the invention also may be practiced with a single transparent conductor or two opaque conductors, as long as the conductor materials do not interfere with the color changes or the IR signature changes of the device. A layer 38 of material that changes color upon being activated by charged ions is deposited upon the lower surface of the upper conductor 34. The color changeable layer may include an electro-chromatic material or another material that changes color upon receiving charged particles. A layer 40 of IR control material that changes its IR signature upon being activated by charged ions is deposited upon the upper surface of the lower conductor 36. Finally, a layer of electrolyte 42 containing an ionic material is placed between the color changeable layer 38 and the IR control layer 40.

The transparent conductors 34 and 36 are electrically connected through a double pole center off switch 44 to a voltage supply 46. The double pole center off switch 44 includes two ganged single pole double throw center off switches 48. While mechanical devices are shown for the switches 48 in FIG. 2 for illustrative purposes, it will be understood that the switching device 44 also may include electronic switches, such as, for example, bipolar transistors or field effect transistors (not shown) in lieu of the mechanical switches 48. For the switch positions shown in FIG. 2, no voltage is applied to the device 30 and both the layer of color changeable material 38 and the layer of IR control material 40 are in their inactive state. However, upon moving the switches 48 to their upper positions, a voltage is applied across the device 30 with the voltage applied to the lower transparent conductor 36 being negative with regard to the upper transparent conductor 34. Similarly, moving the switches 48 to their lower positions applies a voltage across the device 30 with the voltage being applied to the upper transparent conductor 34 being negative with regard to the lower transparent conductor 36.

Figure 3:
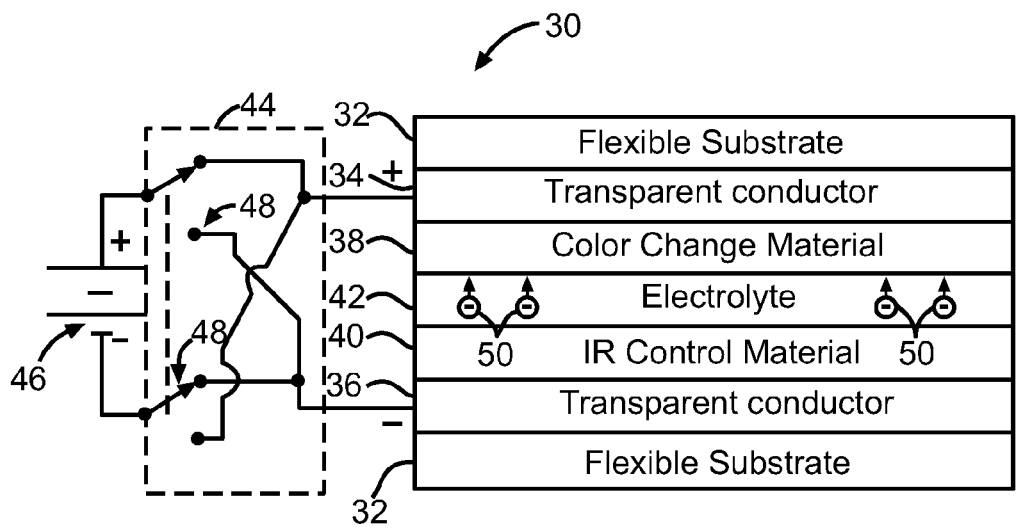
FIG. 3 illustrates a first state of operation of the device shown in FIG. 2.
Figure 4:
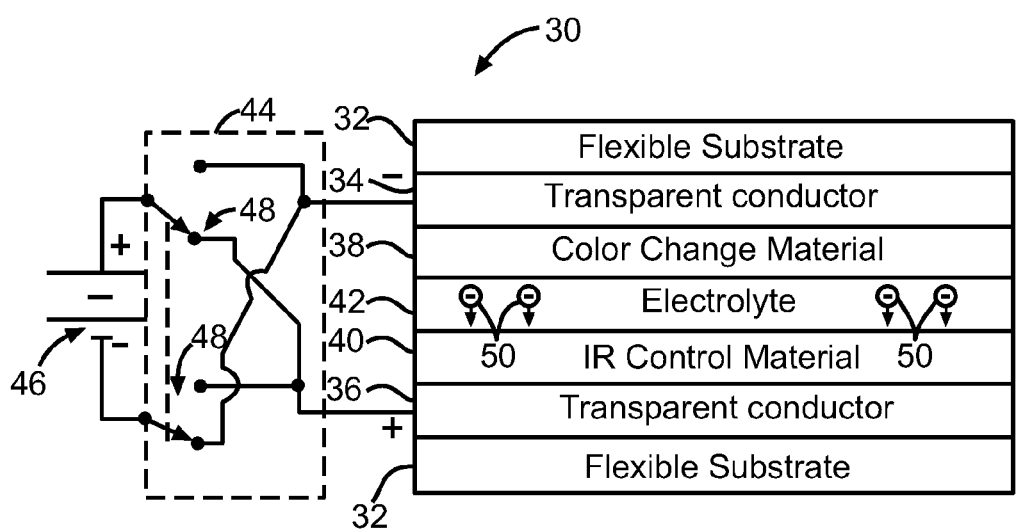
FIG. 4 illustrates a second state of operation of the device shown in FIG. 2.

A first embodiment of the invention contemplates that the layer 42 of electrolyte includes an anionic material that includes ions in which the number of electrons exceeds the number of protons, giving the material a net negative charge. Additionally, the first embodiment also includes layers of color changeable material and IR control material 38 and 40, respectively, which are activated by anions, or negative ions. The operation of the first embodiment of the invention is illustrated in FIGS. 3 and 4. In FIG. 3, the switches 48 are moved to their upper closed positions to apply a negative voltage to the lower transparent conductor layer 36 relative to the upper transparent conductor layer 34. The negative voltage drives negatively charged anions 50 into the color changeable layer 18 to activate the material and thereby cause a change of color of the device 30. If, on the other hand, the switches 48 are moved to their lower closed positions, as shown in FIG. 4, the voltage applied to the upper transparent conductor 34 becomes negative with regard to the lower transparent conductor layer 36. Accordingly, the application of the negative voltage to the upper transparent conductor layer 34 drives negative anions 50 into layer 40 of IR control material to active the material and thereby cause a change of the IR signature of the device 30. Returning the switches to their neutral position also returns the affected layer of either the color changeable material or the IR control material to its inactive state. Additionally, increasing the magnitude of the applied voltage will drive more anions 50 into the layer being activated, thereby increasing the resulting rate of change and intensity of change.

A second embodiment of the invention (not shown) contemplates that the layer 42 of electrolyte includes a cationic material that includes ions in which the number of protons exceeds the number of electrons, giving the material a net positive charge. Additionally, the second embodiment has layers of color changeable material and IR control material 38 and 40, respectively, which are activated by positively charged cations. Accordingly, the application of a positive voltage to the lower transparent conductor layer 36 by moving the switches 46 into their lower closed positions drives positive cations into the color changeable layer 38 to cause a change of color. On the other hand, when the switches 48 are moved to their upper closed positions, the voltage applied to the upper transparent conductor 34 becomes positive with regard to the lower transparent conductor layer 36. Accordingly, the application of a positive voltage to the upper transparent conductor layer 34 drives positively charged ions into layer 40 of IR control to cause a change of the IR signature of the device 30. Again, returning the switches to their neutral position also returns the affected layer of either the color changeable material of the IR control material to its inactive state. Also, increasing the magnitude of the applied voltage will drive more cations into the layer being activated, thereby increasing the resulting rate of change and intensity of change.

The invention also contemplates omitting the upper flexible substrate 32 by forming the upper transparent conductor 34 on the layer of color changeable material 34 (not shown). Similarly, the lower transparent conductor 36 and the layer of IR control material 40 may be the same and/or the upper transparent conductor 34 and the layer of color changeable material 34 also may the same (not shown). In other embodiments, the layer 42 of electrolyte and/or the one of the changeable materials, either the color changeable or the IR control material, may be incorporated into a fabric (not shown). Likewise, either or both of the flexible substrates 32 may be replaced by a rigid substrate (not shown). Additionally, the invention also contemplates using a Carbon NanoTube (CNT) film for one or both of the conductors.

Figures 5, 7:
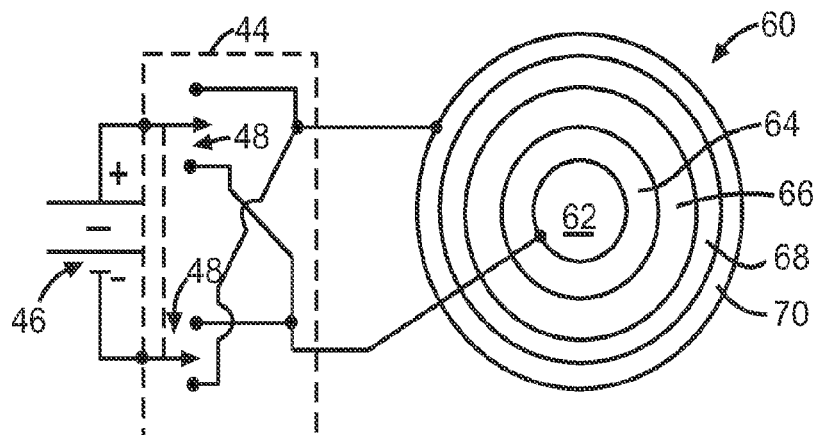
FIG. 5 is a cross section of an alternate embodiment of the electro-chromatic device shown in FIG. 2.
FIG. 7 is a table that includes data from the graphs shown in FIG. 6.

A fiber based embodiment 60 of the present invention is illustrated by the cross sectional view shown in FIG. 5. Components shown in FIG. 5 that are similar to components shown in FIG. 2 have the same numerical identifiers. The embodiment 60 includes an inner fiber conductor 62 that is electrically connected to a first terminal of the switch 44. The inner fiber conductor 62 is surrounded by a layer 64 of IR control material which, in turn, is surrounded by a layer of electrolyte 66 containing an ionic material. The layer of electrolyte 66 is surrounded by a layer of color changeable material 68 which is surrounded by a transparent outer conductor 70. The outer conductor 70 is electrically connected to a second terminal of the switch 44. The ion containing material forming the electrolyte layer 66 may be either anionic with a net negative charge or cationic with a net positive charge. The material forming the IR control layer 64 and the color changeable layer 68 is selected to be activated by either anions or cations, as determined by the type of material selected for the electrolyte layer 66. The invention also contemplates using a Carbon NanoTube (CNT) or a CNT film on PolyEthylene-Terephthalate (PET) film for the inner and outer conductors 62 and 70. Additionally, the invention also may be practiced with the layers of color changeable material and IR contol material interchanged (not shown). The operation of the embodiment 60 is similar to the operation of the device 30 shown in FIG. 2. The resulting fibers may be woven into material in which both the color and IR signature may be changed by application of a voltage.

The invention further contemplates depositing the conducting layers upon both sides of a fabric by transferring a CNT film onto the fabric (not shown). This embodiment eliminates the need for a supporting substrate.

Descriptions of several examples the present invention that were fabricated by the inventors follow.

EXAMPLE 1

A: color change device was fabricated by placing a Chemical Wipe between two pieces of ITO-coated PET. The Chemical Wipe vas infused with benzyl viologen difluoride, 5,10-dihydro-5, 10-dimethelyphenazine in propylene carbonate at 1:1 molar ratio @0.25 percent concentration. Application of a voltage caused the device to change color.

EXAMPLE 2

An electro-chromic device was produced by placing a few drops of a solution of polyethylene glycol, PAA and lithium perchlorate between two ORGACON sheets. ORGACON is a PEDOT-coated PET film, and can act as both the conductive layer and the electro-chromatic medium. Application of a voltage between the two sheets produced a color change with the device going from gray to blue when energized.

EXAMPLE 3

A fabric device was prepared where one carbon nanotube (CNT) electrode was applied to the fabric and the second electrode was a CNT film on PET. The CNT film was applied to the fabric by a "float method", i.e., by passing an aqueous surfactant assisted CNT dispersion through: an Anodisc membrane filter, floating the CNT film onto water, and then transferring to the fabric. Initially, the light yellow viologen solution did change color when voltage was applied This device changed colors two or three times before it stayed in a blue colored form.

A second fabric device was prepared with CNT on either side by the float method. Initially, the light yellow viologen solution did change color when voltage was applied. However, the color did not reverse back to colorless when the voltage was removed, nor did it reverse to colorless when the leads were reversed.

EXAMPLE 4

Two different gels that change in response to electrical voltage were formulated. The first gel was based on propylene carbonate gelled with polyethylene glycol 400 dtacrylate and Vazo 64 as initiator to produce a very clear gel with soft: Jello-0 like consistency. Devices made with this gel exhibit electro-chromic color change with 5,10 dihydro-5,10 dinaethylphenazirte ($\approx$30 mM) & Tetramethylammoium tetrafluoroborate ($\approx$100 nM) as an electro-chromic mixture The color change is more intense. If a drop of: sodium hydroxide added. The second gel was propylene carbonate with 5,10-dihydro-5,10-dtmethylphenazineand Tetrabutylammonium tetrafluoroborate thickened with PMMA beads to a viscous, honey like gel that could be thickened more. Devices made with this gel exhibit very nice and fairly rapid color change, without additional NaOH required. Both gels were reproducible, but neither gel was particularly cyclic, perhaps due to exposure to air. The second gel was placed between both ITO and PET electrodes and ITO on glass electrodes. The second device when from clear, to green, to gray as the applied voltage was increased.

EXAMPLE 5

An electro-chromatic device was fabricated on a single ORGACON sheet by slicing through the conductive layer to make two distinct electrodes. A drop of an electrolyte was placed over the cut, and the two electrodes were energized. A color change was observed between the electrodes as in Example 2, above. The Raman absorbance of the material in the region of the cut was measured before the voltage was applied, then after the voltage was applied with a 9 Volt battery. The results are illustrated by the graphs shown in FIG. 6 and the results summarized by the table show in FIG. 7. The results show large differences in the spectra due to the activation of the film with the 9 volts. The color change was accompanied by a large change in IR signature (emissivity=absorptivity at thermal equilibrium) for the electro-chromatic material.

Figure 6:
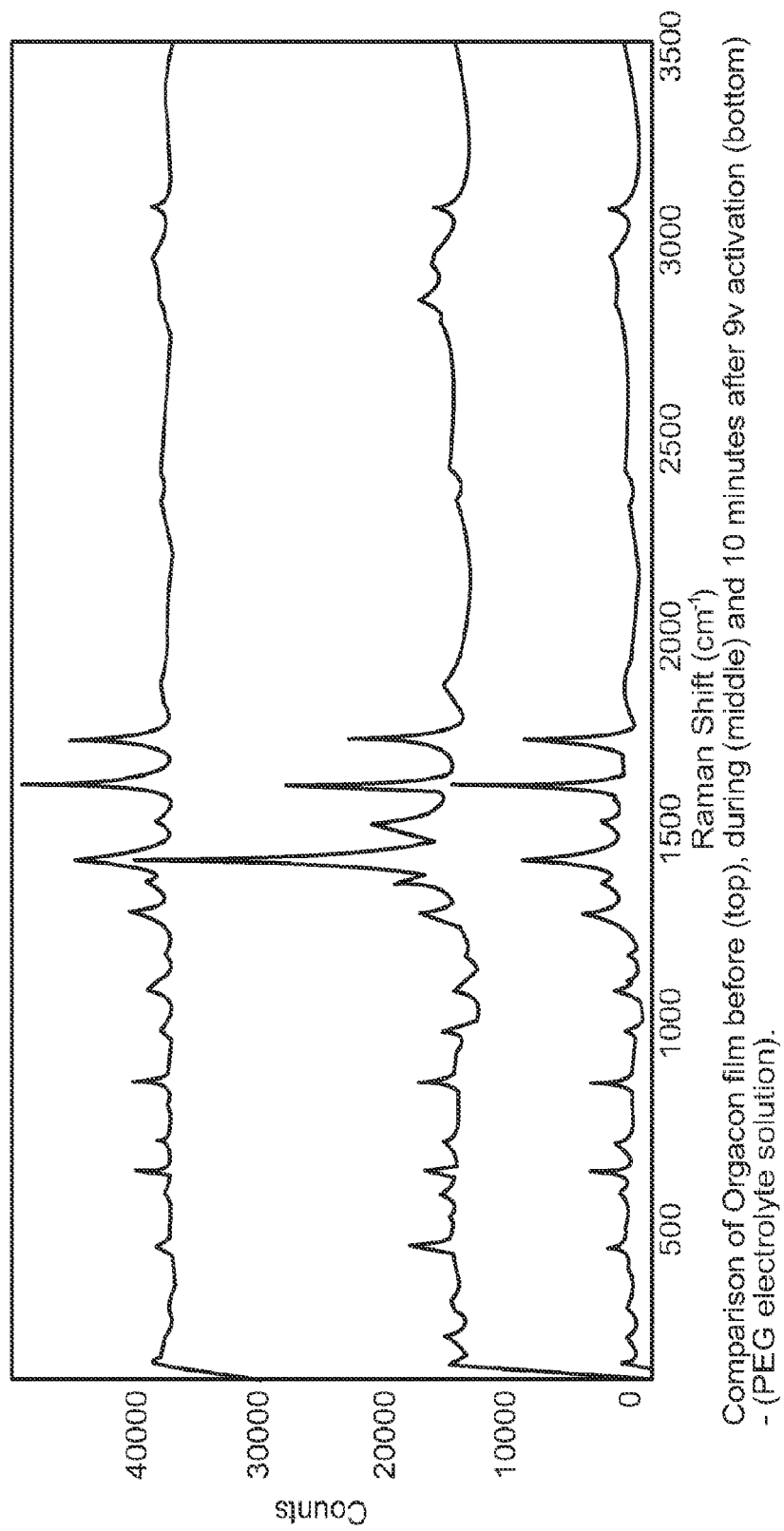
FIG. 6 includes graphs that illustrate the operation of a device that is accordance with the present invention.

Referring to graphs shown in FIG. 6, the peaks at 1421 $cm^{-1}$ (assumed to relate to the electro-chromic material) and at 1621 $cm^{-1}$ (polyethylene terephthalate PET) were measured using a local baseline and their ratios calculated As can be seen in the Table shown in FIG. 7, the peak intensity at 1421 $cm^{-1}$ increased approximately 2.5 fold under activation while the PET peak appears to have decreased slightly. The result was that the electro-chromic material peak to PET peak ratio changed from approximately 0.6 to nearly 2.0, indicating a dramatic increase in intensity.

EXAMPLE 6

An electrochromic device was fabricated by placing an electrolyte between two ORGACON pieces. An IR camera sensitive in the 8-12 micron range was used to take images of the film before and after application of voltage. Conversion of the image to apparent temperature showed an increase in apparent temperature where the color change seemed to be strongest. This may be due to the increased absorption (emissivity) of the device, or may be due to thermal heating from the application of voltage.

EXAMPLE 7

Figure 8:
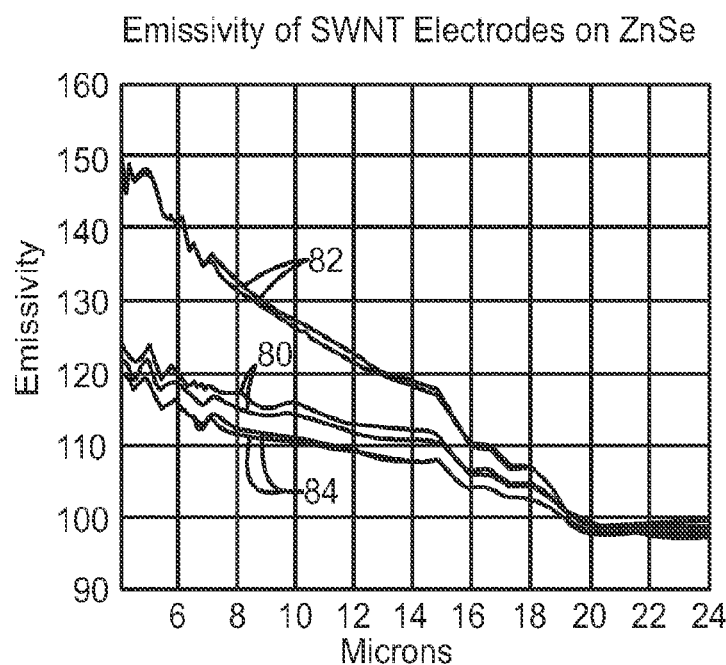
FIG. 8 illustrates the emissivity measured for p-doped and n-doped Carbon NanoTube (CNT) films.
Figure 9:
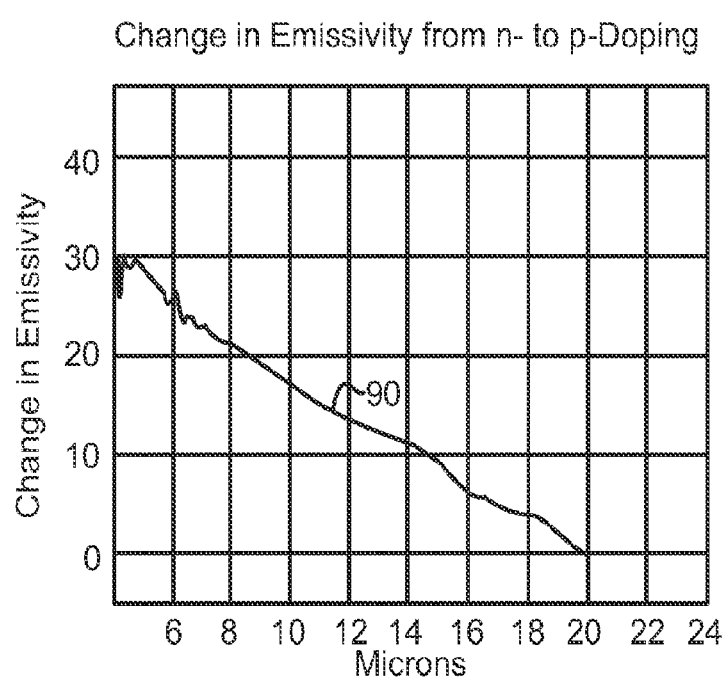
FIG. 9 is a graph of the difference between the emissivity graphs for p and n doped CNT films shown in FIG. 8.

The sensitivity of the emissivity of CNTs to doping was demonstrated by forming a CNT film with Single Walled Carbon Nanotube (SWNT) electrodes on a ZnSe slide. The emissivity of the CNT film was then measured in the range of 4 to 24 microns, with the results shown by the curves labeled 80 in FIG. 8. A second film was formed, and the film was then p-doped using thionyl chloride and standard solution doping procedures. The emissivity of the film was measured with the results shown as the curves labeled 82 in FIG. 8 which are substantially larger than for the non-doped film curves 80. A third film was formed and the film was n-doped using isopropyl amine. The emissivity of this film also was measured with the results shown as the curves labeled 84 in FIG. 8 which are less than that of the non doped film curves 80. The difference in emissivity between the p-doped and ndoped CNT films is shown by the curve labeled 90 in FIG. 9.

EXAMPLE 8

A CNT film was formed and soaked in a Li-containing electrolyte. Voltage was applied to film to use Li intercalation as the doping method. This attempt to use Li intercalation to drive the change was not successful, possibly because the change in potential was not sufficient. Open literature indicates that it should be feasible to drive these changes with potential changes from −0.4 V to 1.0 V.

EXAMPLE 9

An electrochemical device that provides the change from p- to n-dope using changes in potential was developed and successfully demonstrated. The demonstration was carried out at NIR frequencies and showed that the electrochemical approach can successfully provide the doping changes needed. In many cases, it would be preferable to have a device capable of performing this switching in a patterned fashion. This would allow for better matching to the background both when stationary and while in motion. By using patterned electrodes, it will be possible to apply a camouflage pattern and alter this pattern in real-time. This patterning can be obtained by using multiple electrodes to cover each side of the active material, then combining the electrodes via multiplexing circuitry.

There are several requirements to allow this concept to function. A first requirement is that the electrode material used in the system must be patternable. Use of CNT electrodes ensures this condition is met. A second requirement is that the return to the off (zero voltage) state must take longer than the time to induce the on-state, i.e., when voltage is applied to the material. The ratio of these times determines the number of "pixels" that can be established for a given electrode structure. A third requirement is that the active material and activation method must be suited to patterning For example, patterning with a thermochromic material would be difficult because of thermal transport, unless the individual "pixels" were thermally isolated from each other.

The present invention represents an improvement over the prior art by being capable of being switched between controlling color and controlling an IR signature. The present invention also differs from the prior art by using two cathodic-driven materials, or two anodic-driven materials, with the polarity of the applied voltage determining which material is activated. The present invention further differs from the prior art by the use of a CNT film as one or both electrodes without the need of a substrate to support the CNT film.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:
1. An electro-chromatic device comprising:
   a first conductor adapted to be connected to a voltage supply;
   a layer of Infra-Red (IR) control material disposed upon said first conductor;
   a layer of electrolytic material disposed upon a surface of said IR control material that is opposite from said first conductor;
   a layer of color changeable material disposed upon a surface of said electrolytic material that is opposite from said IR control material; and
   a second conductor adapted to be connected to a voltage supply, said second conductor disposed upon a surface of said color changeable material that is opposite from said electrolytic material.
2. The device according to claim 1 wherein said color changeable layer includes an electro-chromatic material.
3. The device according to claim 2 wherein at least one of said conductors is formed from a transparent material.
4. The device according to claim 3 wherein at least one of said conductors is formed as a Carbon NanoTube (CNT) film.
5. The device according to claim 2 further including a switching device adapted to be connected to the voltage supply, said switching device connected to said first and second conductors and operable to selectively apply a first voltage to said first and second conductors, said switching device further operable to selectively apply a second voltage to said first and second conductors, said second voltage having a reverse polarity from that of said first voltage.

6. The device according to claim 5 wherein said electrolytic material is an anionic material with a net negative charge and further wherein said color changeable material is activated to change the color of the device by application of said first voltage to said first and second conductors to urge anions from said electrolytic material into said color changeable material and said IR control material is activated to change the IR signature of the device by application of said second voltage to said first and second conductors to urge anions from said electrolytic material into said IR control material.

7. The device according to claim 6 wherein said IR control material and color changeable material revert to their original states when said voltages are removed from said first and second conductors.

8. The device according to claim 7 wherein said layers and conductors are formed as parallel sheets.

9. The device according to claim 8 wherein said parallel sheets are disposed upon a substrate.

10. The device according to claim 9 wherein said substrate is formed from a flexible material as a first flexible substrate and further wherein the device includes a second flexible substrate disposed upon a surface of the device opposite from said first flexible substrate.

11. The device according to claim 7 wherein said first conductor is formed as a fiber and further wherein said layers and said second conductor are formed as concentric layers over said first conductor.

12. The device according to claim 5 wherein said electrolytic material is an cationic material with a net positive charge and further wherein said color changeable material is activated to change the color of the device by application of said first voltage to said first and second conductors to urge cations from said electrolytic material into said color changeable material and said IR control material is activated to change the IR signature of the device by application of said second voltage to said first and second conductors to urge cations from said electrolytic material into said IR control material.

13. The device according to claim 12 wherein said IR control material and color changeable material revert to their original states when said voltages are removed from said first and second conductors.

14. The device according to claim 13 wherein said layers and conductors are formed as parallel sheets.

15. The device according to claim 14 wherein said parallel sheets are disposed upon a substrate.

16. The device according to claim 15 wherein said substrate is formed from a flexible material as a first flexible substrate and further wherein the device includes a second flexible substrate disposed upon a surface of the device opposite from said first flexible substrate.

17. The device according to claim 13 wherein said first conductor is formed as a fiber and further wherein said layers and said second conductor are formed as concentric layers over said first conductor.

18. A method for changing one of color or Infra-Red (IR) signature of a device comprising the steps of:
  (a) providing a device that includes:
    a first transparent conductor;
    a layer of Infra-Red (IR) control material disposed upon the first transparent conductor;
    a layer of electrolytic material disposed upon a surface of the IR control material that is opposite from the first transparent conductor;
    a layer of color changeable material disposed upon a surface of the electrolytic material that is opposite from the IR control material; and
    a second conductor disposed upon a surface of the color changeable material that is opposite from the electrolytic material; and
  (b) applying a voltage to the first and second conductors to cause one of the color of the color changeable material to change or the IR signature of the control material to change.

19. The method according to claim 18 wherein application of a first voltage to the conductors in step (b) activates the color change material to change the color of the device while application of a second voltage having a polarity opposite from the first voltage to the conductors in step (b) activates the IR control material to change the IR signature of the device.

20. The method according to claim 19 further including a step of removing the voltages from the first and second conductors to cause the control material and color changeable material to revert to their original states.

* * * * *